(12) United States Patent
Zanghellini

(10) Patent No.: US 7,388,063 B2
(45) Date of Patent: Jun. 17, 2008

(54) REPAIR KIT

(75) Inventor: Gerhard Zanghellini, Schaan (LI)

(73) Assignee: Invicon Chemical Solutions GmbH, Lustenau (AT)

( * ) Notice: Subject to any disclaimer, the term of this patent is extended or adjusted under 35 U.S.C. 154(b) by 297 days.

(21) Appl. No.: 11/111,933

(22) Filed: Apr. 22, 2005

(65) Prior Publication Data

US 2005/0239993 A1 Oct. 27, 2005

(30) Foreign Application Priority Data

Apr. 23, 2004 (AT) ................ A 700/2004

(51) Int. Cl.
*C08F 20/02* (2006.01)
*C08F 20/06* (2006.01)

(52) U.S. Cl. ................ 526/317.1; 526/318; 526/318.2

(58) Field of Classification Search ............. 526/317.1, 526/318, 318.2
See application file for complete search history.

(56) References Cited

U.S. PATENT DOCUMENTS 3,692,557 A * 9/1972 Sormani ................ 427/257
6,103,800 A * 8/2000 Peterson et al. ............. 524/296
2002/0009552 A1 1/2002 Ueno
2003/0008936 A1* 1/2003 Wachter et al. ............. 523/115

FOREIGN PATENT DOCUMENTS

| AT | 241 513 | | 7/1965 |
| EP | 0 982 363 | * | 3/2000 |
| GB | 1 514 549 | | 6/1978 |
| GB | 2 360 039 | | 9/2001 |
| JP | 64-79084 | | 3/1989 |
| WO | 98/14486 | | 4/1998 |
| WO | WO 98/14486 | * | 4/1998 |

OTHER PUBLICATIONS

Anonymous, "Natuursteen", Internet Article, Online!, Dec. 20, 2003, URL: web.archive.org/web/20031220153942/http://www.beltraco.nl/index.html.

* cited by examiner

*Primary Examiner*—Ling-Siu Choi
(74) *Attorney, Agent, or Firm*—Wenderoth, Lind & Ponack, L.L.P.

(57) ABSTRACT

A repair kit for repairing damaged areas (2) in surfaces (5) or on edges of objects (1) of natural stone, in particular of marble, includes a liquid or highly viscous filler material (3), which is curable by polymerization, polyaddition or polycondensation, and furthermore at least one granulate (4) already cured by polymerization, polyaddition or polycondensation.

13 Claims, 1 Drawing Sheet

REPAIR KIT

BACKGROUND OF THE INVENTION a) Field of the Invention

The invention relates to a repair kit for repairing damages in surfaces or on edges of objects comprised of natural stone, in particular of marble, comprising a liquid or highly viscous filler material, which is curable by polymerization, polyaddition or polycondensation.

b) Description of Related Prior Art

Natural stone is employed for example for high-quality cover plates in the area of kitchen construction, facade construction and floor coverings. Natural stone is inter alia also utilized for art objects and in road construction. Especially in high-quality application areas, damage, such as scratches, chipping or broken off edges, can represent a large loss. Replacement of the damaged natural stone is very expensive and also time-consuming. It is furthermore already known to repair damage to natural stone. Such repair is faster, less expensive and can be carried out on site. However, there is a considerable loss of quality due to the repair. In particular the visual impression is negatively affected immediately after the repair. Most often, the conventional repair systems are not particularly well matched in terms of color. However, systems are also already known, in which by color retouching or by dyeing the repair material, better matching to the appearance of the natural stone is achieved. However, the result, especially in the case of natural stone with a crystalline structure, is often unsatisfactory. This applies especially to white marble. For that reason attempts have already been made to mix ground marble into the filler substance, whereby, however, an advantageous repair could also not be achieved. For example, it was no longer possible to finish, for example by polishing, the repair site in a suitable manner after it had been filled with the repair material.

SUMMARY OF THE INVENTION

The aim of the invention is providing a repair kit of the above described type, with which damaged sites of natural stone, in particular of marble, can be advantageously repaired, with the repaired site being minimally noticeable.

According to the invention this is achieved through a repair kit for repairing damage in surfaces or on edges of objects comprised of natural stone, in particular of marble, comprising a liquid or highly viscous filler material, which is curable by polymerization, polyaddition or polycondensation and which comprises at least one granulate already cured by polymerization, polyaddition or polycondensation.

In a method according to the invention for repairing damages in surfaces or on edges of natural stone, in particular of marble, utilizing a liquid or highly viscous filler material, which is curable by polymerization, polyaddition or polycondensation, a granulate, already cured by polymerization, polyaddition or polycondensation, is introduced, in addition to the filler material, into the area of the damage and the filler material is subsequently cured.

By filling the damage in the natural stone with, in addition to the filler material, a granulate, cured by polymerization, polyaddition or polycondensation, a significantly better matching of the repair site to the remaining natural stone surface can be achieved. The granulate can herein advantageously have mechanical properties that are similar to the cured filler material. This permits obtaining an even and smooth surface through mechanical finishing by grinding or cutting off protruding cured filler material and granulate as well as by polishing. The cured filler material and the at least one granulate contained in the repair kit advantageously belong to the same class of substances, i.e. to the same group or class of polymers, polyadducts or polycondensates.

In an especially preferred embodiment of the invention the cured filler material and the at least one granulate each comprise polymethacrylate or polyacrylate, and specifically in proportions of 10 percent by weight, a value of at least 40 percent by weight being especially preferred. Besides that, various addition substances can be comprised therein, such as for example color additives or filler substances, for example ground glass, for example barium glass.

It is especially, preferred for the filler material to comprise multifunctional methacrylates or acrylates and/or to form the granulate of a starting material, which comprises multifunctional methacrylates or acrylates. This results in a cross-linked polymer after the filler material or the starting material of the granulate has been cured. The advantages are higher thermal endurance properties, improved abrasion resistance, high resistance to solvents and increased hardness.

In another embodiment variant the filler material and the at least one granulate could comprise epoxy resins, preferably in proportions of at least 10 percent by weight, with a value of at least 40 percent by weight being especially preferred. In a yet different embodiment variant the filler material and the at least one granulate could comprise polyester resins, preferably in proportions of at least 10 percent by weight, with a value of at least 40 percent by weight being especially preferred. In addition, again various addition substances can be comprised in these two embodiments.

Further advantages and details of the invention will be explained in the following in conjunction with the attached drawing, based on which further aims of the invention are evident.

DETAILED DESCRIPTION OF THE PREFERRED EMBODIMENT EXAMPLES

Figure 1:
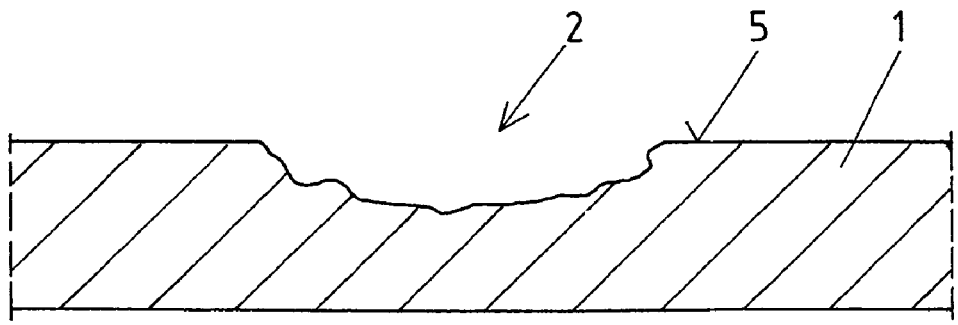
FIG. 1 is a cross section through a plate of natural stone with a damaged surface.

FIG. 1 shows a schematic section of a plate-shaped object 1, for example a cover plate or a work top, comprised of natural stone with a crystalline structure, in particular marble. The top surface of this plate-shaped object 1, which forms for example a work surface, has a damaged area 2 in the form of material broken out of the natural stone. With a repair kit according to the invention, chips, cracks or relatively deep scratches in the surface can also be repaired. Furthermore, broken-off edges can also be repaired.

Figure 2:
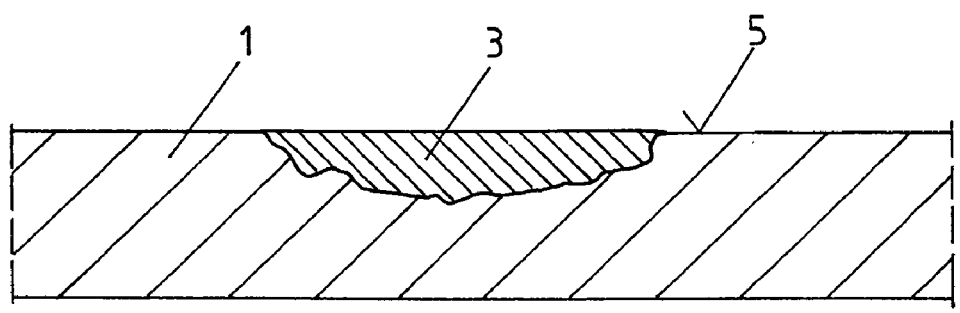
FIG. 2 is a cross section corresponding to FIG. 1 after the filler material has been introduced into the damaged area.

A repair kit according to the invention includes a liquid or highly viscous filler material 3. The latter is initially filled into the damaged area from a supply container, as is shown schematically in FIG. 2. Before filling the filler material 3 into the irregular depression forming the damaged area 2, the natural stone 1 is cleaned with a solvent in the area of the damaged area 2. Before introducing the filler material 3, furthermore, an adhesion promotor can optionally be applied. The damaged area 2 can also be widened with a rotating instrument before it is cleaned, if such appears favorable for the repair. Adhesion promotors in various forms are known, for example in the case of filler materials based on methacrylate activated hydroxy silanes, for example methacryloylalkyl silanes, can be utilized.

Figure 3:
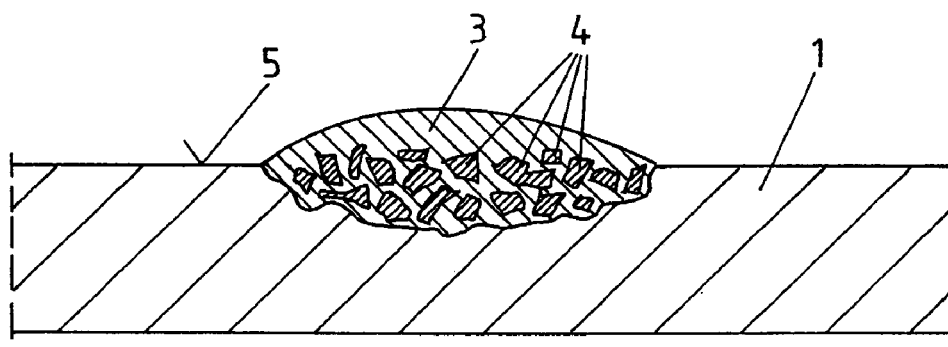
FIG. 3 is a cross section corresponding to FIG. 2 after the granulate has been introduced.
Figure 4:
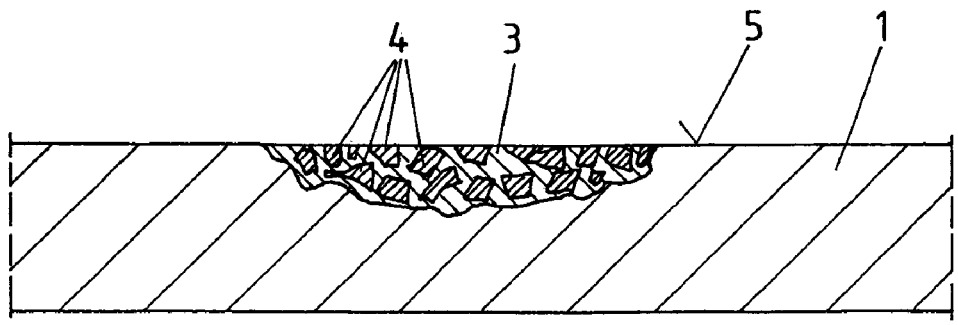
FIG. 4 is a cross section corresponding to FIG. 3 after the repair has been completed.

After the filler material 3 has been introduced into the damaged area 2, granulate 4 is pressed into the filler material 3. The depression forming the damaged area 2 is now slightly overfilled, as is evident in FIG. 3. In this embodiment example the filler material 3 is now cured by polymerization. Curing under the action of light (photopolymerization) is herein preferred.

The excess material protruding above the surface 5 is subsequently removed by a grinding or cutting process. For example, a conventional lacquer planing tool can be employed. If during this removal slight porosities result in the repair area, these can be filled out again with the filler material 3, whereupon the filler material is cured again by polymerization and the surface is planed again.

The surface is subsequently polished in the area of the repair site. The damage is consequently repaired.

As described, the filler material 3 in this embodiment example is curable by polymerization and comprises at least one monomer, the monomer proportion preferably amounting to at least 40 percent by weight of the filler material. In a preferred embodiment of the invention the monomer proportion is formed by at least one methacrylate. Furthermore, the filler materials comprises an initiator for initiating the polymerization, for example camphor quinone and/or benzoin derivatives for a photopolymerization or peroxides or pinacols for curing under the effect of increased temperature. Coloring substances and/or further addition substances can also be comprised therein. Due to the curing, consequently, a polymer is formed based on polymethacrylate.

The granulate 4 in this embodiment example is comprised of material cured by polymerization; it consequently contains preferably at least 40 percent by weight of a polymer. In the preferred embodiment of the invention, in which the filler material comprises at least one methacrylate, the granulate 4 includes at least one polymethacrylate.

Instead of methacrylates or polymethacrylates, acrylates or polyacrylates can also be utilized.

In other embodiment variants of the invention filler materials can be utilized, which comprise epoxy resins or polyester resins. In these systems at least two components of the resin (curing agent and base resin) must be mixed immediately preceding the application for the purpose of activating the curing. In these cases, consequently, the cured filler material belongs to the substance class 'artificial epoxy resins' or 'artificial polyester resins'.

If the cured filler material comprises epoxy resins, the granulate preferably also comprises epoxy resins. If the cured filler material comprises polyester resins, the granulate also preferably comprises polyester resins.

In preferred embodiments of the invention the granulate 4 consequently belongs to the same substance group, i.e. to the same group (class) of polymers, polyadducts or polycondensates as the filler material 3 after it has been cured. In this way, after the curing of the filler material 3 introduced into the repair site with the granulate 4 contained therein, advantageous finishing is made possible, in which as a final result a polished planar surface is obtained, which is flush with the surface 5 of the repaired object 1 adjoining the repair site.

The granulate 4 is formed by crushing cured material. A synthetic formulation based on the same substance class as the repair material is herein produced. This liquid or highly viscous mixture is cured (polymerized, polyadded or polycondensated), in particular with the application of heat or light, wherein the comprised initiator is activated. A further feasibility for curing is chemical curing. In this case a two-component system is involved, for example amine-peroxide, Co-hydroperoxide, amine-epoxide, isocyanate-polyol, etc. The cured material is subsequently crushed to the desired grain size by means of a crushing mill or cutting mill. Fine-crystalline or coarse-crystalline natural stone can be simulated through the selection of the grain size. The average grain size of the grains of the granulate depends on the type of application and advantageously is at least 0.05 mm and maximally 5 mm, the range between 0.1 mm and 3 mm being especially preferred. A repair kit according to the invention can also comprise two or more different granulates, for example with different grain sizes and/or colors and/or opacities contained in separate supply containers. For example, a transparent and a white granulate can be provided each having two different average grain sizes, for example 1 mm and 2 mm.

By varying the color and/or the transparency or opacity of the granulate and/or of the filler material, matching the repair site to the surface 5 of the natural stone can be optimized. Colored granulates can be utilized for example for the repair of granites.

Depending on the desired effect, there can be differences of greater or lesser degree between the cured filler material and the granulate in terms of color and/or opacity, in order to generate a suitable contrast between the cured filler material and the granulate, if such is desired.

The repair kit can comprise several filler materials 3, which differ in color and/or transparency. For example, a largely crystal-clear filler material and a white filler material (with more or less pronounced transparency) can be provided, each of these filler materials again being contained in separate supply containers. In addition, different coloring substances can be provided, each in separate supply containers, which can be mixed into the filler material to match it to the color of the natural stone (while it is introduced into the damaged area).

In contrast to the repair described with reference to FIGS. 1 to 4, the filler material 3 and the granulate 4 can also be mixed already before being introduced into the damaged area.

Depending on the appearance of the crystalline structure of the natural stone, the grains of the granulate 4 can have a sharp-edged or angular or rounded-off structure, and the latter can be obtained, for example, by tumbling of the sharp-edged structures.

In the region of its external surface the repaired site has cut granulate grains. These are formed during the finishing after the filler material 3 has been cured by grinding or planing of the material protruding above the surface 5 of the object 1 to be repaired. These cut granulate grains simulate the crystal structure of the natural stone.

EXAMPLES

Example Formulation for the Filler Material

| | |
|---|---:|
| Diurethane dimethacrylate CAS 72869-86-4 | 79.80% |
| Triethylene glycol dimethacrylate CAS 109-16-0 | 20.00% |
| DL-camphor quinone CAS 10373-78-1 | 0.20% |
| | 100.00% |

Example Formulation for the Starting Material of the Granulate

| | |
|---|---|
| Diurethane dimethacrylate CAS 72869-86-4 | 78.50% |
| Triethylene glycol dimethacrylate CAS 109-16-0 | 20.00% |
| Titanium dioxide CAS 13463-67-7 | 1.00% |
| Benzoyl peroxide CAS 94-36-0 | 0.50% |
| | 100.00% |

As is evident based on the above description, the field of the invention is not limited to the described embodiment example, but should be determined with reference to the entire disclosure and the full range of feasible equivalents. While the preceding description and the drawing represent the invention, it is obvious to a person of skill in the art that distinctive modifications therein can be carried out without going beyond the true essence and scope of the invention.

LEGEND TO THE REFERENCE NUMBERS

Object
Damage
Filler material
Granulate
Surface

The invention claimed is:

1. A repair kit for repairing damage in surfaces or on edges of objects of natural stone, comprising:
    a liquid or highly viscous filler material which is polymerizable; and
    at least one polymerized granulate separate and free of the filler material, wherein the filler material includes multifunctional (meth)acrylates and the at least one granulate is formed of a starting material which includes multifunctional (meth)acrylates.

2. A repair kit as claimed in claim 1, wherein the filler material is to be applied to a surface of the natural stone, the at least one granulate is to be pressed into the filler material, and the filler material is to be polymerized,
    and wherein the at least one granulate and the filler material belong to the same group of polymers upon polymerization of the filler material.

3. A repair kit as claimed in claim 1, wherein the filler material is to be applied to a surface of the natural stone, the at least one granulate is to be pressed into the filler material, and the filler material is to be polymerized,
    and wherein the filler material, upon polymerization, and the at least one granulate each have a content of poly(meth)acrylate of at least 40 percent by weight.

4. A repair kit as claimed in claim 1, wherein the repair kit comprises at least two granulates with different average grain sizes contained in two separate supply containers.

5. A repair kit as claimed in claim 1, wherein an average grain size of the at least one granulate is at least 0.05 mm.

6. A repair kit as claimed in claim 5, wherein the average grain size of the at least one granulate is at least 0.1 mm.

7. A repair kit as claimed in claim 1, wherein the repair kit comprises color addition substances to be added to the filler material.

8. A repair kit as claimed in claim 1, wherein the repair kit has at least two filler materials with at least one of different opacities and different colors contained in separate supply containers.

9. A repair kit as claimed in claim 1, wherein the repair kit comprises at least two granulates with at least one of different opacities and different colors contained in separate supply containers.

10. A repair kit as claimed in claim 1, wherein grains of the at least one granulate have sharp-edged structures.

11. A repair kit as claimed in claim 1, wherein grains of the at least one granulate are rounded off.

12. A repair kit as claimed in claim 1, wherein the repair kit comprises an adhesion promoter contained in a separate supply container.

13. A repair kit as claimed in claim 1, wherein the filler material is photopolymerizable.

* * * * *